July 18, 1961 A. H. COUCH ET AL 2,992,514
GLASS MELTING FURNACE CONSTRUCTION
Original Filed June 10, 1955 3 Sheets-Sheet 2

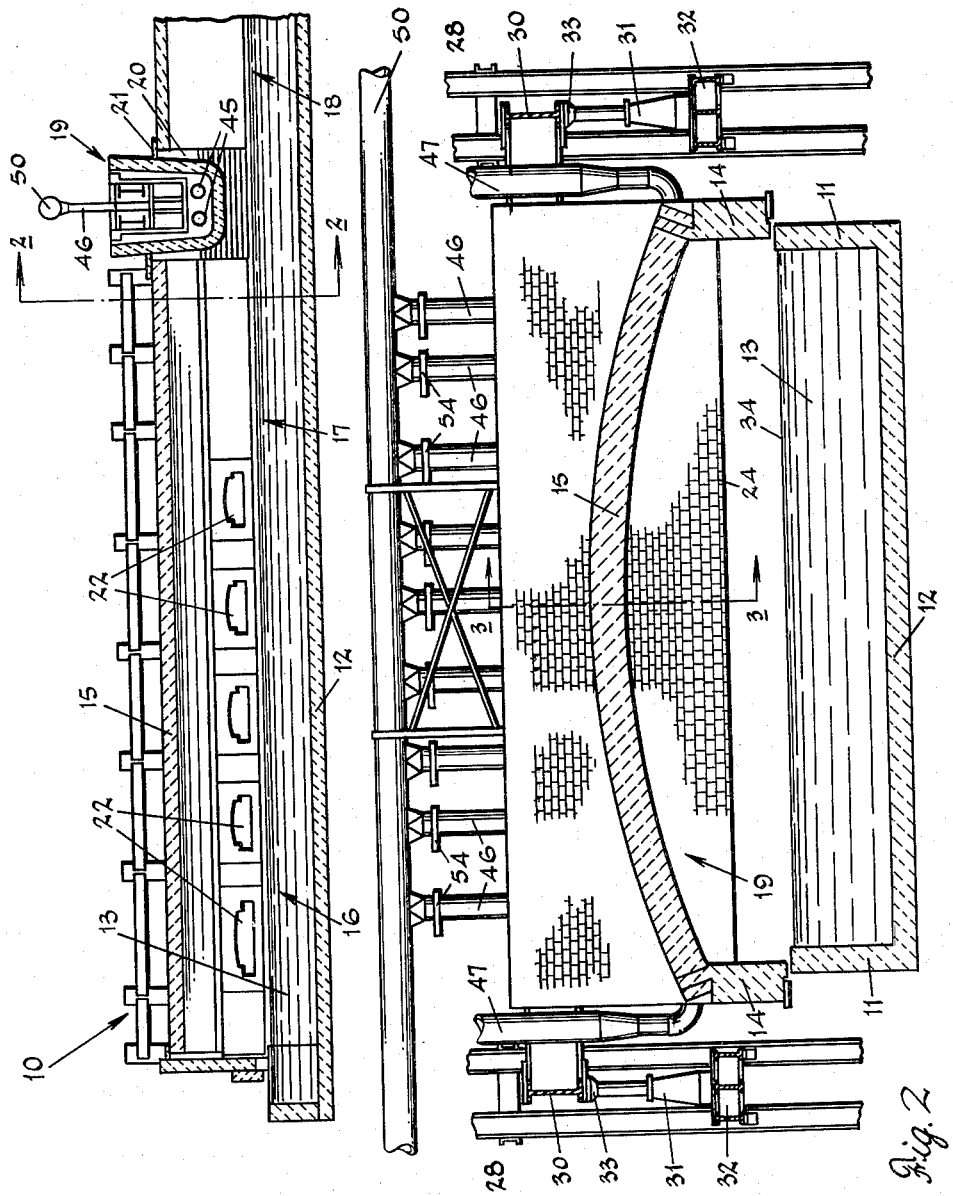

INVENTORS
Albert H. Couch and
BY John H. Hansen
Nobbe & Swope
ATTORNEYS

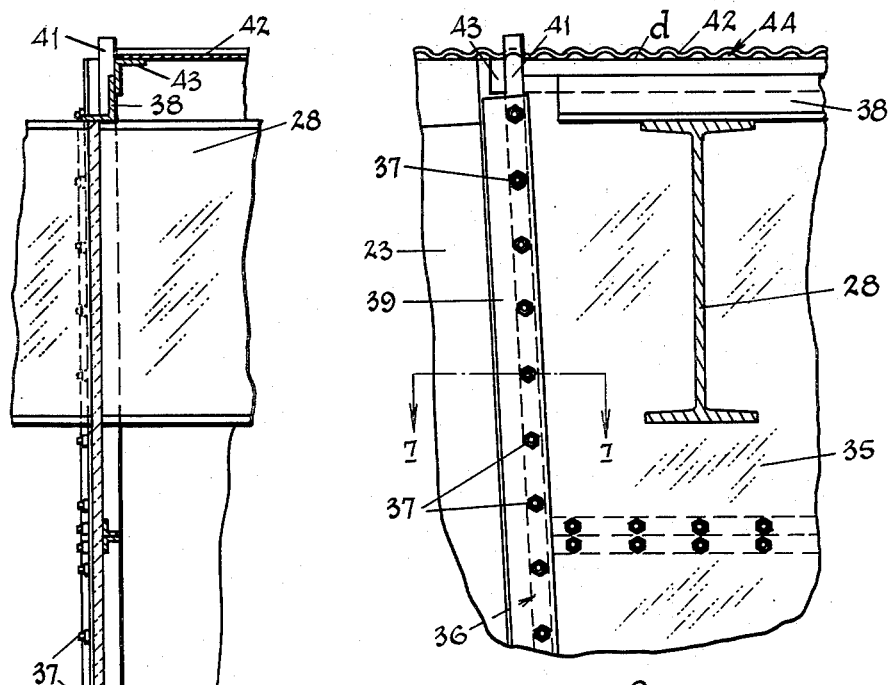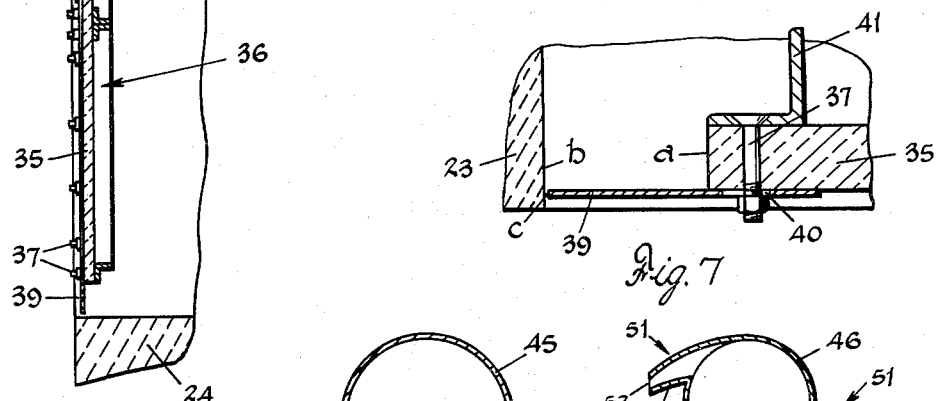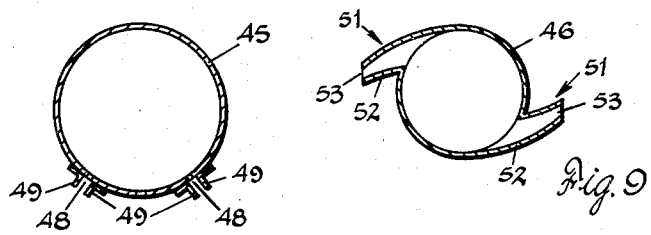

United States Patent Office 2,992,514
Patented July 18, 1961

2,992,514
GLASS MELTING FURNACE CONSTRUCTION
Albert H. Couch, Maumee, and John H. Hansen, Toledo, Ohio, assignors to Libbey-Owens-Ford Glass Company, Toledo, Ohio, a corporation of Ohio
Continuation of application Ser. No. 514,486, June 10, 1955. This application June 2, 1958, Ser. No. 742,459
2 Claims. (Cl. 49—54)

This invention relates generally to furnaces, and more particularly to improvements in furnace walls, arches and the like.

This application is a continuation of our co-pending application Ser. No. 514,486, filed June 10, 1955, now abandoned.

Although not restricted thereto, the present invention is particularly well adapted for use in prolonging the refractory life of the so-called shadow wall commonly employed in glass melting tank-type furnaces of the regenerative type.

In such a furnace, the furnace zones through which the molten glass passes while being processed are commonly termed the melting, fining, and cooling or conditioning zones. The heating of the glass in the melting and fining zones is effected by means of flames issuing from a series of regenerative ports disposed opposite one another in each of the furnace side walls. The flames from the ports are periodically passed from side-to-side above the molten glass bath and heat the surface of the bath along with the furnace roof which in turn directs radiant heat downwardly toward the bath which is best heated in depth by radiation. In the cooling or conditioning zone, the molten bath is not normally directly heated and the temperature of the glass drops down to the required working temperature as it passes through this zone.

It is desirable in glass furnaces, as well as other types of furnaces, to keep cold air from penetrating to the furnace interior through refractory joints or other furnace openings. Therefore, the stack draft is adjusted so that the interior of the furnace is constantly maintained at a pressure in excess of that of the atmosphere.

To prevent the molten glass in the conditioning zone from being exposed to radiant heat emitted from the flames and white-hot refractory roof and side walls in the melting and fining zones, a refractory shadow wall or suspended arch is commonly mounted for movement in a vertical plane between the fining and conditioning zones. Such a suspended shadow wall is normally U-shaped and has its interior exposed to the atmosphere through its open upper side.

In the past, it has been found that the positive pressure of the furnace atmosphere causes corrosive vapors and dust in said atmosphere to be forced through the refractory joints in the arch. This is due to the difference in pressure between the arch interior and the furnace atmosphere and has the resultant effect of corroding the arch refractory.

The corrosive dust is primarily of alkaline nature and is contained within the raw batch materials which are introduced into the furnace interior in granulated or powdered form and are then fused and reduced to a molten state by the furnace heat. However, the fusing action does not take place immediately, and the powdered batch materials are picked up by the drafts within the furnace interior and carried into contact with the various exposed refractory structures and react unfavorably therewith. While fusing, the batch materials also give off corrosive vapors which have a like effect on refractory.

When these corrosive vapors and dust penetrate through the refractory joints of the shadow wall, the magnitude of the corrosive attack upon the refractory is increased since a given joint is exposed to greater attack by the flow of furnace vapors therethrough.

It is an important object of the present invention to provide a refractory furnace structure capable of better withstanding attack by corrosive furnace vapors.

Another object of the invention is to provide a refractory shadow wall for glass furnaces having means incorporated therewith for increasing refractory life.

Another object of the invention is to provide a shadow wall in which lower grade refractories may be economically used.

A further object of the invention is to provide a shadow wall for glass melting furnaces which is constructed as a pressure chamber, and means for maintaining the interior of said wall at a greater pressure than the furnace atmosphere.

Other objects and advantages of the invention will become more apparent during the course of the following description when taken in connection with the accompanying drawings.

In the drawings, wherein like numerals are employed to designate like parts throughout the same:

FIG. 1 is a longitudinal section along the center line of a typical regenerative type glass melting tank having a shadow wall provided therein which is constructed in accordance with the invention;

FIG. 2 is a transverse section through the furnace taken substantially along the line 2—2 of FIG. 1;

FIG. 5 is an enlarged fragmentary side view showing a closure plate for the end of the shadow wall;

FIG. 6 is a partial end view of the closure plate shown in FIG. 5;

FIG. 7 is an enlarged detail taken along the line 7—7 of FIG. 6 showing the joint construction between the closure plate and the side wall of the shadow wall;

FIG. 8 is a section taken along the line 8—8 of FIG. 4 showing the openings in one of the pressure headers positioned within the arch interior; and FIG. 9 is a section taken along the line 9—9 of FIG. 4 showing the openings in another type of header.

Figure 3:
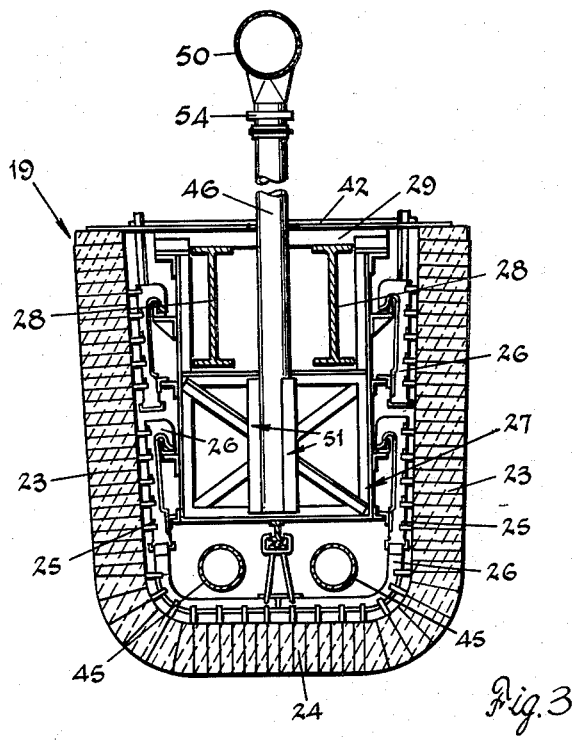
FIG. 3 is a transverse section through the shadow wall taken along the line 3—3 of FIG. 2.

With reference now to the drawings and particularly to FIG. 1, there is shown a typical regenerative type glass melting tank or furnace 10. This tank is of the type commonly used for the production of sheet or plate glass and, as seen in FIG. 2, is substantially rectangular in cross section having oppositely disposed lower side walls 11 connected to one another by a bottom wall 12 which walls confine a molten bath of glass 13 therebetween. The upper side walls 14 of the tank are supported independently of the lower side walls 11 by suitable supporting steel (not shown), and the space therebetween is spanned by a roof portion 15 in the form of a sprung arch.

The interior of the tank 10 is commonly thought of as being divided into a plurality of furnace zones including a melting zone 16, a fining zone 17, and a cooling or conditioning zone 18 which is separated from the fining zone 17 by a suspended shadow wall, or arch, built in accordance with the invention and designated in its entirety by the numeral 19. Since it is desirable that the shadow wall be vertically adjustable, the roof 15 and the upper side walls 14 of the tank have a transverse opening 20 provided therein of slightly greater width than the shadow wall for receiving the same. When the tank is operating, the gap between the shadow wall and the tank roof and side walls is closed by means of refractory blocks 21.

The tank interior in the melting and fining zone is heated by means of flames which issue from a series of regenerator ports 22 provided in each of the tank side walls. The firing of the ports is such that flames are passed alternately from side-to-side across the tank at periodic intervals, and the withdrawal of products of combustion is controlled so that the tank interior is maintained at a pressure slightly in excess of that of the atmosphere.

As best seen in FIG. 3, the shadow wall is substantially U-shaped in cross section and comprises opposite refractory side walls 23 and a bottom wall 24. The various refractory blocks comprising the walls are held in their proper position by suitable restraining members 25 which engage notches provided in the blocks and, in turn, are supported by metallic castings 26 carried by an angle iron supporting framework designated in its entirety by the numeral 27. To support the shadow wall, a pair of spaced transversely disposed I-beams 28 have their upper flanges engaging channels 29 forming a portion of the supporting framework 27 and extend beyond the opposite ends of the shadow wall to be joined to one another at each of their opposite ends by an I-beam 30.

The shadow wall is mounted for vertical movement by means of a pair of adjustable jacks 31 supported exteriorly of the tank. The jacks are carried by a structural steel platform 32 and have their head portions 33 engaging the lower flanges of the I-beam 30. By providing for vertical movement of the shadow wall, the distance between the bottom wall 24 thereof and the surface 34 of the glass bath 13 may be adjusted to regulate the surface area of the glass in the conditioning zone with respect to the square footage thereof being exposed to radiant heat from the tank roof and side walls in the melting and fining zones.

It was previously mentioned that the furnace interior is maintained at a slight positive pressure to prevent the entry of colder atmospheric air through refractory joints and that the pressure forces corrosive dust-like particles of batch material and vapors into the refractory joints of the shadow wall. According to the invention, the shadow wall is constructed as a pressure chamber and is maintained at a positive pressure equal to, or in excess of, the pressure in the furnace by introducing air under pressure into the interior of the arch.

Figure 4:
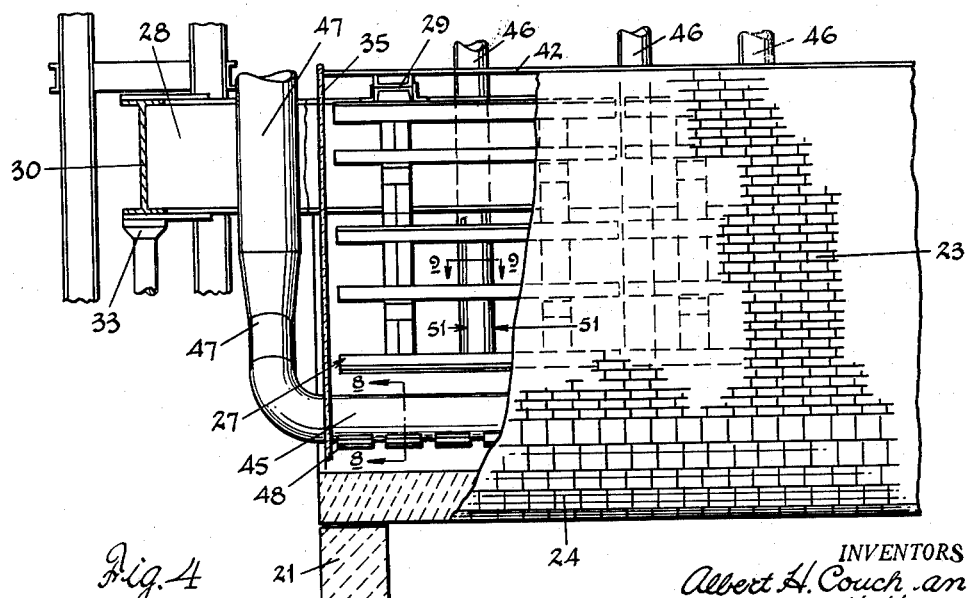
FIG. 4 is an enlarged fragmentary side view of the shadow wall with a portion of the side wall thereof cut away to show the interior structure.

As seen in FIGS. 4 to 6, the opposite ends of the shadow wall interior may be substantially sealed by means of end closure plates 35 constituting end walls. Each plate 35 may be in the form of a sheet of insulation which is cut to an outline somewhat smaller than the cross-sectional outline of the shadow wall interior and has suitable openings therein through which the I-beams 28 pass. The plate 35 is stiffened and supported by means of an angle iron frame 36 which is attached thereto by means of a plurality of bolts 37. Suitable clip angles 38 are provided to secure the frame 36, at its upper extremity, to the upper flange of the I-beams 28.

To bridge the gap between the edge $a$ of the closure plate 35 and the interior face $b$ of the side walls 23 (FIG. 7), a seal plate 39 is joined to the outer face of the closure plate by means of the bolts 37 which pass through slots 40 provided in the seal plate and which have their heads received in a vertical angle 41 forming a portion of the stiffening frame 36. For a purpose to be later described, it is desirable that the distance between the end $c$ of the seal plate and the interior face $b$ of the side wall be adjustable. To regulate this distance, it is only necessary to loosen the bolts 37 and bodily shift the seal plate sideways.

The open top of the shadow wall may be substantially closed by means of a cover plate 42 forming a top wall which is loosely supported along its side edges by the side walls 23, and at its end by clip angles 43 joined to the clip angles 38. As seen in FIG. 6, the cover plate 42 is preferably of corrugated metal so as to provide air gaps 44 along the upper edge $d$ of the side walls 23.

To pressurize the interior of the shadow wall and also to cool the same, a pair of horizontal air headers 45 are disposed in the lower portion of the shadow wall interior, and a plurality of vertical headers 46 extend downwardly through the cover plate 42 in a transverse line along substantially the entire length of the wall.

The horizontal headers 45 are disposed adjacent to but spaced upwardly from the bottom wall 24 and extend over the entire length thereof. Each of the headers have their opposite ends protruding through the closure plates 35 and joined to vertical ducts 47 connected to suitable air blowers (not shown). As seen in FIG. 8, the headers 45 have pairs of oppositely disposed longitudinal slots 48 located in the lower peripheral edge thereof and provided with angles 49 which act as flanges to direct the passage of air therethrough. These slots, as shown in FIG. 4, are located at a plurality of spaced points along the length of the headers to provide equal distribution of air directed against the bottom wall 24 along the entire length thereof.

The vertical headers 46 extend downwardly through the cover plate 42 from a common transverse header 50, supplied with air by blowers (not shown), and terminate in the shadow wall interior above the headers 45. As seen in FIGS. 4 and 9, the headers 46 are provided with air outlets 51 which are continuous for a given distance along the header and are formed by curved wing plates 52 extending outwardly from the header and which define vertical slots 53 provided therein. To afford control of the volume of air passing through each of the vertical headers 45, a suitable valve 54 of the blast gate type is provided in the upper end of each of the headers adjacent its point of connection with the main header 50. Since the headers 46 are spaced along substantially the entire length of the shadow wall, the air issuing from the outlets 51 thereof is directed against the side walls 23 over the major portion of their length.

Due to the combined action of the horizontal and vertical air headers, streams of air are directed against the interior faces of the refractory walls comprising the shadow wall 19 and thus serve to maintain these refractory portions at temperatures calculated to materially increase the life of the refractory and also cool the various metallic members comprising the arch supporting structure. At the same time, the shadow wall, due to its ends and top being substantially closed, acts as a pressure chamber and the air emitted by the headers not only gives a cooling effect but also maintains the interior of the shadow wall at a pressure sufficient to prevent furnace vapors or dusts from penetrating through refractory joints and corroding the same.

In operating the pressurizing and cooling system of the shadow wall, it has been found preferable to maintain the input of air relatively constant and to control the amount of air escaping from the wall to vary the pressure thereof. It is also desirable that the air escapes about the entire perimeter of the wall interior.

This control of the air is effected by adjusting the seal plates 39 and the cover plate 42. To vary the amount of air passing between the seal plate and the side walls 23, it is only necessary to shift the seal plate sideways until the space between the end $c$ thereof and the interior face $b$ of the side wall is sufficient to pass the desired volume of air. Although there are normally openings 44 between the cover plate 42 and the top $d$ of the side wall, the volume of air escaping along the top of the wall can be increased by raising the plate 42 a slight distance above the side walls.

By then controlling, in combination, the positions of the seal plate and the cover plate, the internal pressure of the shadow wall may be properly adjusted and at the same time an outward flow of air is maintained about the entire perimeter of the wall.

Since the usual operation conditions in a tank-type glass melting furnace call for furnace interior pressures in the order of approximately 0.02 inch of water column, it is only necessary that the pressure within the shadow wall be maintained equal to, or slightly in excess of, that in the furnace interior so that negligible amounts of air penetrate between the refractory joints into the furnace interior.

With a pressure wall constructed in accordance with the invention, refractory materials having lower resistance to corrosive attack may be more economically used. For example, the refractory portions of the wall may be composed of regular silica brick which has approximately the following composition:

|  | Percent |
|---|---|
| $SiO_2$ | 95.8 |
| $Fe_2O_3$ | 0.5 |
| $Al_2O_3$ | 0.5 |
| $TiO_2$ | 0.1 |
| CaO | 2.8 |
| MgO | 0.1 |

Such a refractory is considerably cheaper than mullite or sillimanite which are commonly used in refractory structures exposed to high temperatures and corrosive attack.

If the interior of an arch employing a regular silica refractory were not pressurized, the corrosive attack, especially at the joints of the refractory, would be considerable. As previously mentioned, the severity of the joint attack is due to dusts and vapors penetrating the refractory joints. The vapors are the more serious and after penetrating the joints between the refractory blocks tend to condense as they approach the cold or interior face of the shadow wall and pass from the gaseous to the liquid state and thus become more active. This is especially the case when glass batches containing high percentages of iron, for example 0.50%, are used. It has been found that the vapors and dust from the melting of such materials increases the corrosive attack on the refractory. However, by pressurizing the interior of the shadow wall in accordance with the invention, the refractory life can be materially extended.

It is to be understood that the form of the invention herewith shown and described is to be taken as a preferred embodiment of the same, and various changes may be resorted to without departing from the spirit of the invention or the scope of the following claims.

We claim:

1. In a tank-type melting furnace having the interior thereof maintained at a pressure greater than atmospheric and containing a bath of molten glass, a hollow shadow wall constructed as a pressure chamber and disposed above the surface of the molten glass, means establishing an aeroform fluid in said pressure chamber under a continuous pressure at least equal to the pressure within the furnace to prevent entry of furnace vapors into joints in said shadow wall, and means for controlling the escape of the pressurized fluid to maintain an outward flow of the pressurized fluid about the entire perimeter of said shadow wall, said shadow wall including refractory side and bottom walls and end and top plates, said fluid escape control means including means for adjusting said top plate and said end plates to provide openings between said plates and the adjacent refractory walls.

2. In a tank-type glass melting furnace having the interior thereof maintained at a pressure greater than atmospheric, a hollow shadow wall extending into the interior of the furnace, said shadow wall having refractory side and bottom walls and end and top walls which substantially close off the hollow interior of said wall, and air conduits passing through said walls for conveying air under pressure to the interior of said shadow wall whereby said interior is maintained at a pressure equal to or in excess of the furnace atmosphere, said air conduits including a conduit disposed within the shadow wall and adjacent the bottom wall thereof and having holes provided therein for directing air against said bottom wall, and a plurality of other conduits disposed within the shadow wall and having openings formed therein for directing air against the side walls of said shadow wall.

References Cited in the file of this patent

UNITED STATES PATENTS

| 1,638,737 | Kutchka | Aug. 9, 1927 |
| 1,937,321 | Howard | Nov. 28, 1933 |